United States Patent [19]

Hirunuma et al.

[11] Patent Number: 6,108,134
[45] Date of Patent: Aug. 22, 2000

[54] VIEWING OPTICAL INSTRUMENT HAVING AN IMAGE STABILIZER

[75] Inventors: Ken Hirunuma, Tokyo; Shinji Tsukamoto, Saitama, both of Japan

[73] Assignee: Asahi Kogaku Kogyo Kabushiki Kaisha, Tokyo, Japan

[21] Appl. No.: 09/104,904

[22] Filed: Jun. 25, 1998

[30] Foreign Application Priority Data

Jun. 26, 1997 [JP] Japan ................................. 9-169971

[51] Int. Cl.⁷ ............................. G02B 27/64; G02B 23/00
[52] U.S. Cl. ......................... 359/557; 359/407; 359/429; 359/554
[58] Field of Search ................................... 359/554–557, 359/813, 814, 823, 824, 407–410; 396/52–55; 348/208

[56] References Cited

U.S. PATENT DOCUMENTS

| | | | |
|---|---|---|---|
| 5,243,462 | 9/1993 | Kobayashi et al. | 359/557 |
| 5,305,040 | 4/1994 | Enomoto | 396/55 |
| 5,539,575 | 7/1996 | Kakizawa et al. | 359/554 |
| 5,754,339 | 5/1998 | Kanai et al. | 359/557 |
| 5,768,016 | 6/1998 | Kanbara | 359/554 |
| 5,917,653 | 6/1999 | Taniguchi | 359/557 |

*Primary Examiner*—Thong Nguyen
*Attorney, Agent, or Firm*—Pitney, Hardin, Kipp and Szuch LLP

[57] ABSTRACT

Disclosed is a viewing optical instrument which includes: a first image stabilizer for stabilizing the vision in the viewing optical instrument in a first direction; a second image stabilizer for stabilizing the vision in the viewing optical instrument in a second direction perpendicular to the first direction; a first switch for manually turning the first image stabilizer ON or OFF; and a second switch, provided independently from the first switch, for manually turning the second image stabilizer ON or OFF.

1 Claim, 4 Drawing Sheets

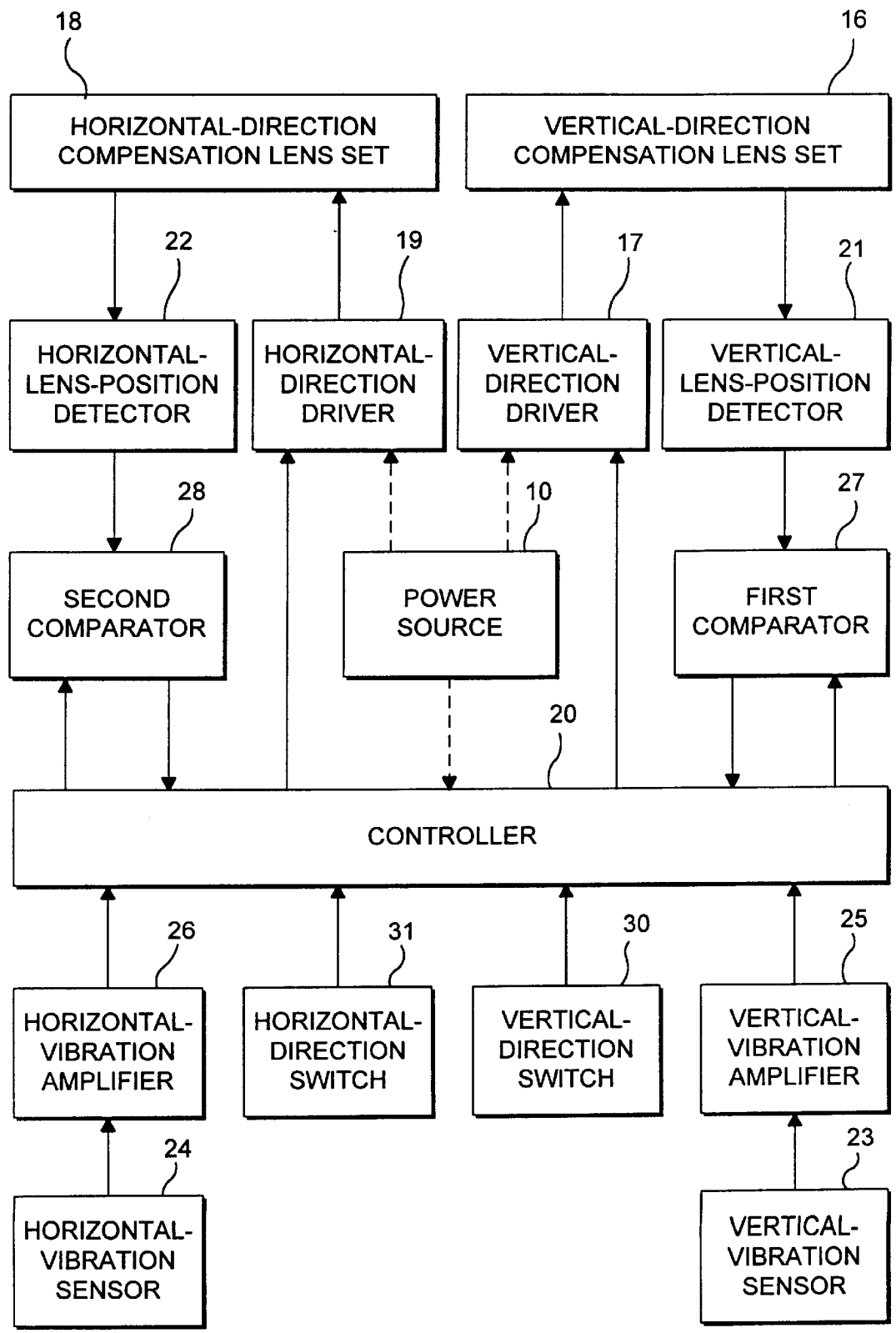
F I G. 2

VIEWING OPTICAL INSTRUMENT HAVING AN IMAGE STABILIZER

BACKGROUND OF THE INVENTION

1. Field of the Invention

The present invention relates to a viewing optical instrument such as a telescope which is provided with an image stabilizer for stabilizing the vision in the viewing optical instrument subjected to hand movement.

2. Description of the Related Art

A telescope, which may be a monocular telescope or a binocular telescope, that is provided with an image stabilizer having a vibration compensation function is well known. The image stabilizer prevents the telescope vision in the telescope from shaking due to hand movement or the like to provide shake-free viewing and minimal eye fatigue.

In such type of conventional telescope, the image stabilizer prevents the telescope vision from shaking in general, both in the horizontal and vertical directions. Therefore, with the image stabilizer being turned ON, when the telescope is panned horizontally so as to keep track of an object (e.g., a bird) which is initially still but starts moving right or left in a horizontal direction, the image stabilizer operates to compensate the shaking of the telescope vision (hereinafter referred to as "image shake") in the direction opposite to the panning direction to reduce the image shake, which causes the motion of the telescope vision to deviate from the panning motion, possibly resulting in the user of the telescope noticing incongruity in the telescope vision while panning. Subsequently, if the moving object suddenly changes to move in the reverse direction and the user thus pans the telescope accordingly to keep track of the object in the same direction, the image stabilizer again operates to compensate the image shake in the direction opposite to the panning direction, which causes the object image to substantially deviate from the telescope vision at the time of panning. Thereafter, the moment the user stops moving the telescope upon the stoppage of the object, the telescope vision slightly moves or shakes even though the telescope is no longer in motion because the image stabilizer is still operating for initializing the stabilizing system upon the stoppage of the telescope. Obviously, with this type of stabilizing system, the image stabilizer operates against the user's intention when he or she intentionally moves the telescope in the horizontal direction. Consequently, if the user desires the image stabilizer to stabilize the telescope vision in the vertical direction while the user pans the telescope in the horizontal direction, the user must tolerate the incongruous motion of the telescope vision in the horizontal direction. This problem also occurs when the telescope is panned vertically. Accordingly, in any conventional telescope having an image stabilizer, it is sometimes the case that the user of the telescope notices incongruity in viewing the telescope vision during the use of the telescope.

Conventional viewing optical instruments provided with an image stabilizer tend to be bulky and heavy because they are designed to compensate image shake in all directions. However, in a binocular, for example, image shake tends to occur mostly in the vertical direction. This is because the wrists of the user with the binocular being held by both hands tend to move in forward and rearward directions and that the binocular can be stably held easily since the binocular is usually held by both hands with both eyepiece positions of the binocular being pressed against respective portions of the face of a user around his or her eyes. Specifically, when the binocular is used by a skilled user, little image shake in horizontal direction occurs. In this particular case it is unnecessary for the image stabilizer to be provided with a vibration compensation function for compensating image shake in the horizontal direction. However, depending upon the difference in the way the individual user holds the binocular, and also the conditions of use, image shake may often occur in the horizontal direction but hardly occur in the vertical direction. Namely, in conventional viewing optical instruments provided with an image stabilizer, it can be said that for some users and/or under specific conditions of use, the image stabilizer unnecessarily operates to compensate an image shake in a specific direction.

SUMMARY OF THE INVENTION

The present invention has been established so as to overcome the aforementioned problems. An object of the present invention is to provide a telescope having an image stabilizer in which no unnecessary vibration compensation is performed by the image stabilizer to thereby minimize eye fatigue and power consumption of the battery employed. Another object of the present invention is to provide a compact and light-weight telescope having an image stabilizer.

According to an aspect of the present invention, there is provided a viewing optical instrument which includes: a first image stabilizer for stabilizing the vision in the viewing optical instrument in a first direction; a second image stabilizer for stabilizing the vision in the viewing optical instrument in a second direction perpendicular to the first direction; a first switch for manually turning the first image stabilizer ON or OFF; and a second switch, provided independently from the first switch, for manually turning the second image stabilizer ON or OFF. With this structure, since either the first or second image stabilizer can be selectively turned ON or OFF by the user, no unnecessary vibration compensation will be performed, which minimizes eye fatigue and power consumption.

Preferably, the first direction is a vertical direction of the viewing optical instrument while the second direction is a horizontal direction of the viewing optical instrument.

Preferably, the viewing optical instrument is a binocular.

Preferably, the binocular includes right and left refracting telescope optical systems, wherein the first image stabilizer includes: a first movable lens holder guided in the vertical direction; and a first couple of compensation lenses held by the first movable lens holder which are positioned in right and left optical paths of the right and left refracting telescope optical systems, respectively, and wherein the second image stabilizer includes: a second movable lens holder guided in the horizontal direction; and a second couple of compensation lenses held by the second movable lens holder which are positioned in the right and left optical paths of the right and left refracting telescope optical systems, respectively.

According to another aspect of the present invention, there is provided a viewing optical instrument which includes: only either a first image stabilizer or a second image stabilizer, the first image stabilizer stabilizing the vision in the viewing optical instrument solely in a vertical direction of the viewing optical instrument, the second image stabilizer stabilizing the vision in the viewing optical instrument solely in a horizontal direction of the viewing optical instrument; and a switch for manually turning ON or OFF the either the first image stabilizer or the second image stabilizer.

According to yet another aspect of the present invention, there is provided a viewing optical instrument which includes: an image stabilizer for stabilizing the vision in the viewing optical instrument solely in a vertical direction of the viewing optical instrument; and a switch for manually turning the image stabilizer ON or OFF.

According to yet another aspect of the present invention, there is provided a viewing optical instrument which includes: an image stabilizer for stabilizing the vision in the viewing optical instrument solely in a horizontal direction of the viewing optical instrument; and a switch for manually turning the image stabilizer ON or OFF.

The present disclosure relates to subject matter contained in Japanese Patent Application No. 9-169971 (filed on Jun. 26, 1997) which is expressly incorporated herein by reference in its entirety.

BRIEF DESCRIPTION OF THE DRAWINGS

The present invention will be described below in detail with reference to the accompanying drawings in which:

FIG. 2 is a block diagram showing an embodiment of an electrical circuit for driving the image stabilizer of the binocular;

DESCRIPTION OF THE PREFERRED EMBODIMENTS

Figure 1:
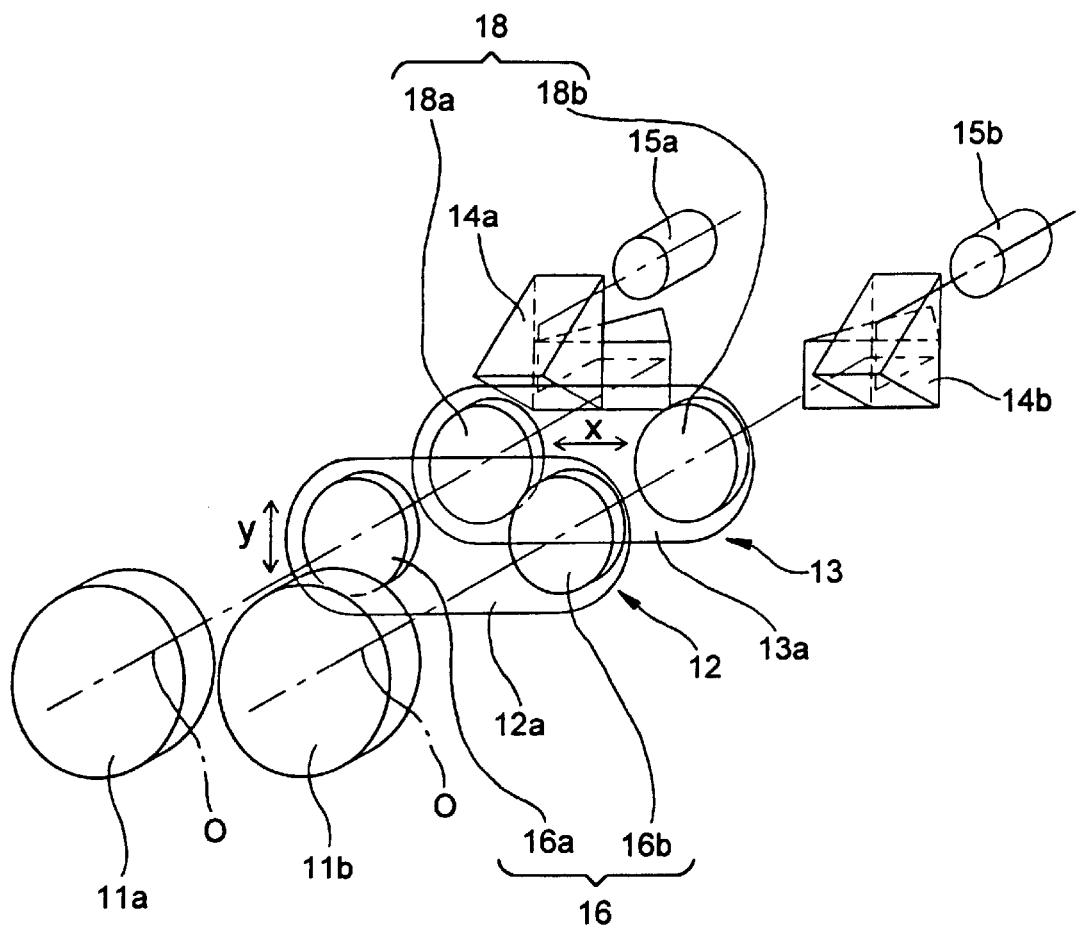
FIG. 1 is a perspective view of an optical system of a binocular having an image stabilizer.

FIG. 1 shows a binocular optical system of a binocular having an image stabilizer. The binocular optical system is composed of two refracting telescope optical systems. The right refracting telescope optical system is composed of an objective lens 11a, a Porro prism erecting system 14a and an eyepiece 15a in this order from the object side. Likewise, the left refracting telescope optical system is composed of an objective lens 11b, a Porro prism erecting system 14b and an eyepiece 15b in this order from the object side. A vertical-vibration compensation mechanism 12 and a horizontal-vibration compensation mechanism 13 are provided between the objective lenses 11a, 11b and the Porro prism erecting systems 14a, 14b.

The vertical-vibration compensation mechanism 12 is provided with a front lens frame 12a guided in a vertical direction of the binocular (indicated by an arrow y in FIG. 1). The front lens frame 12a supports right and left compensation lenses 16a and 16b which lie in the optical paths of the right and left telescope optical systems, respectively. The front lens frame 12a is driven to move in the vertical direction y by a vertical-direction driver 17 (see FIG. 2). When the front lens frame 12a is driven by the vertical-direction driver 17, the right and left compensation lenses 16a and 16b move together in the same vertical direction. The direction shown by the arrow y extends perpendicular to a plane including each optical axis O of the right and left telescope optical systems.

The horizontal-vibration compensation mechanism 13 is provided with a rear lens frame 13a guided in a horizontal direction of the binocular (indicated by an arrow x in FIG. 1). The front lens frame 13a supports right and left compensation lenses 18a and 18b which lie in the optical paths of the right and left telescope optical systems, respectively. The rear lens frame 13a is driven to move in the horizontal direction x by a horizontal-direction driver 19 (see FIG. 2). When the rear lens frame 13a is driven by the horizontal-direction driver 19, the right and left compensation lenses 18a and 18b move together in the same horizontal direction. The direction shown by the arrow x extends perpendicular to both the vertical direction y and a plane including each optical axis O of the right and left telescope optical systems. Both of the vertical-direction driver 17 and the horizontal-direction driver 19 is a conventional linear actuator composed of, for example, a pulse motor and a lead screw. A power source 10, which is ausually a battery (a single cell or a group of cells) accommodated in a binocular body, supplies power to each driver 17, 19 and a controller 20.

FIG. 2 shows an embodiment of an electrical circuit for driving the front and rear lens frames 12a and 13a, i.e., the vertical-direction compensation lens set 16 and the horizontal-direction compensation lens set 18. The electrical circuit is provided with the aforementioned controller 20 generally constituting a CPU which controls the vertical-direction driver 17 and the horizontal-direction driver 19 to drive the front and rear lens frames 12a and 13a to move the vertical-direction compensation lens set 16 and the horizontal-direction compensation lens set 18 in respective directions in accordance with data input thereto.

An inverted image is formed between the objective lens 11a and the Porro prism erecting system 14a and also between the objective lens 11b and the Porro prism erecting system 14b. Therefore, each optical axis O is moved vertically in the direction y when the right and left compensation lenses 16a and 16b (i.e., the vertical-direction compensation lens set 16) are moved vertically in the direction y, while each optical axis O is moved horizontally in the direction x when the right and left compensation lenses 18a and 18b (i.e., the horizontal-direction compensation lens set 18) are moved horizontally in the direction x. The binocular is provided therein with a vertical-lens-position detector 21 and a horizontal-lens-position detector 22 each connected to the controller 20 (see FIG. 2). The vertical-lens-position detector 21 detects the position of the vertical-direction compensation lens set 16 while the horizontal-lens-position detector 22 detects the position of the horizontal-direction compensation lens set 18.

The binocular is provided therein with a vertical-vibration sensor 23 and a horizontal-vibration sensor 24 which together sense vibration or shake of the binocular caused by the hand movement of the user. Each sensor 23, 24 is a conventional gyro sensor. The vertical-vibration sensor 23 exclusively senses the shake of the binocular in the vertical direction while the horizontal-vibration sensor 24 exclusively senses the shake of the binocular in the horizontal direction.

The vertical-vibration sensor 23 and the horizontal-vibration sensor 24 are connected to the controller 20 via a vertical-vibration amplifier 25 and a horizontal-vibration amplifier 26, respectively. The vertical-vibration amplifier 25 firstly cuts off noise in the shake or other sudden movements sensed by the vertical-vibration sensor 23 to obtain a frequency of the sensed shaking (i.e., frequency signal) which indicates the magnitude of shaking and the adirection thereof and subsequently amplifies the obtained frequency signal. Likewise, the horizontal-vibration amplifier 26 firstly cuts off noise in the shake or other sudden movements sensed by the horizontal-vibration sensor 24 to obtain a frequency of the sensed shaking(i.e., frequency signal) which indicates the magnitude of the shaking and the direction thereof and subsequently amplifies the obtained frequency signal. The amplified frequency signals obtained through the vertical-vibration amplifier 25 and the horizontal-vibration amplifier 26 are each input to the controller 20, and the controller 20 calculates a vertical-direction compensation value (adjustment amount) for the vertical-direction compensation lens sets 16 in accordance with the signal input from the vertical-vibration amplifier 25 and also calculates a horizontal-direction compensation value (adjustment amount) for the horizontal-direction compensation lens sets 18 in accordance with the signal input from the horizontal-vibration amplifier 26.

The binocular is provided therein with first and second comparators 27 and 28 each connected to the controller 20. The first comparator 27 compares the vertical-direction compensation value calculated by the controller 20 with a signal output from the vertical-lens-position detector 21 which shows the position of the vertical-direction compensation lens sets 16 to generate a vertical-direction difference signal. Likewise, the second comparator 28 compares the horizontal-direction compensation value calculated by the controller 20 with a signal output from the horizontal-lens-position detector 22 which shows the position of the horizontal-direction compensation lens sets 18 to generate a horizontal-direction difference signal.

The controller 20 is connected to the vertical-direction driver 17 and the horizontal-direction driver 19 to output a drive signal to each of the drivers 17 and 19. The binocular is provided on the body thereof with a vertical-direction compensation ON/OFF switch 30 and a horizontal-direction compensation ON/OFF switch 31 which can be each manually operated. The controller 20 can transmit a drive signal output therefrom to the vertical-direction driver 17 when the vertical-direction compensation ON/OFF switch 30 is ON but does not transmit the same to the vertical-direction driver 17 when the vertical-direction compensation ON/OFF switch 30 is OFF. Likewise, the controller 20 can transmit a drive signal output therefrom to the horizontal-direction driver 19 when the horizontal-direction compensation ON/OFF switch 31 is ON but does not transmit the same to the horizontal-direction driver 19 when the horizontal-direction compensation ON/OFF switch 31 is OFF.

The image stabilizer of the binocular is provided with two image stabilizers, i.e., a vertical-direction image stabilizer for stabilizing a binocular vision in the binocular in the vertical direction and a horizontal-direction image stabilizer for stabilizing a binocular vision in the binocular in the horizontal direction. The vertical-direction image stabilizer is composed of the elements 16, 17, 20, 21, 23, 25, 27 and 30, while the horizontal-direction image stabilizer is composed of the elements 18, 19, 20, 22, 24, 26, 28 and 31.

Figure 3:
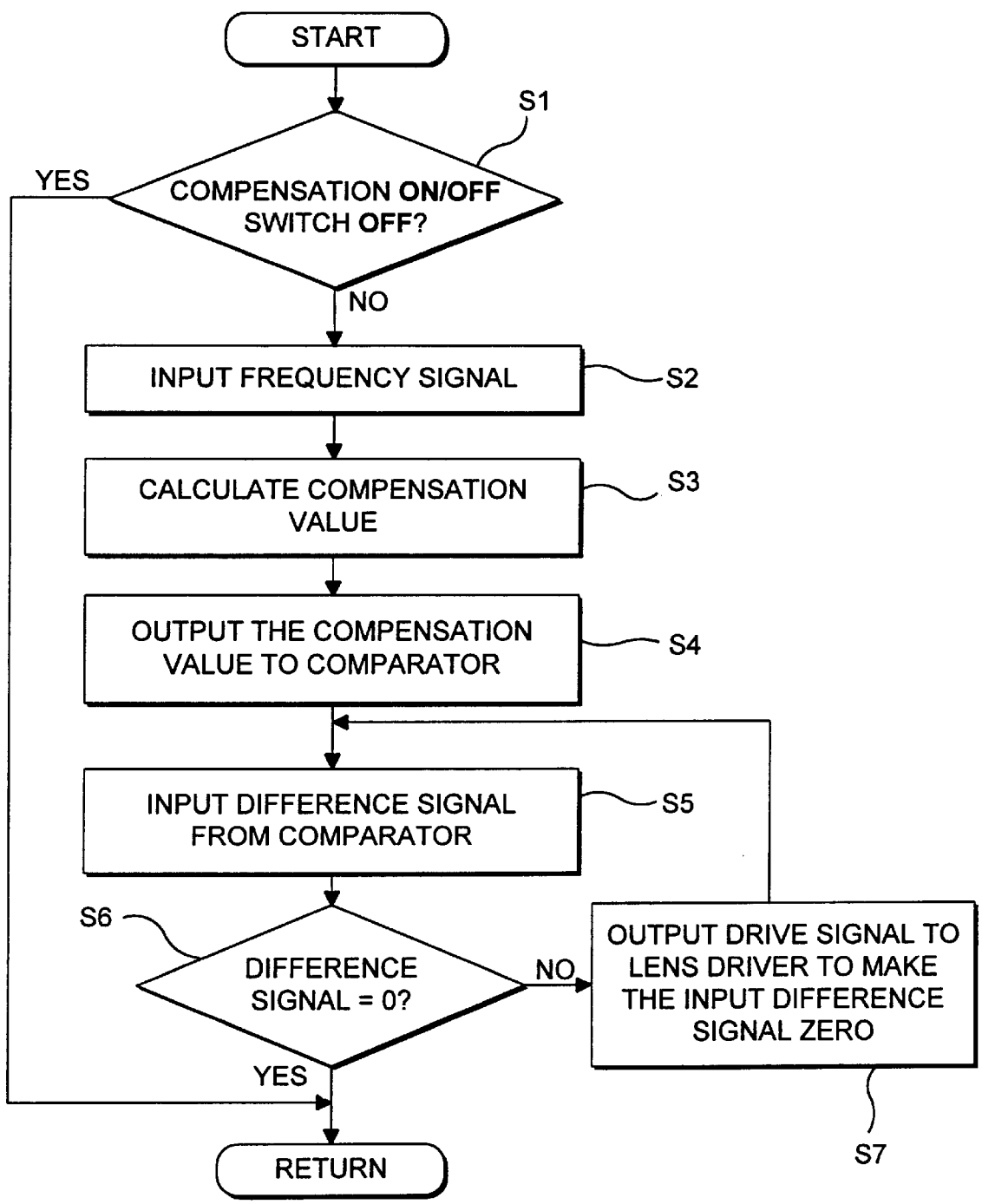
FIG. 3 is a flow chart showing an embodiment of a vibration compensation operation.

FIG. 3 shows a flow chart showing the operations of the vertical-direction image stabilizer and the horizontal-direction image stabilizer. For instance, the verticaldirection compensation ON/OFF switch 30 is turned ON and the horizontal-direction compensation ON/OFF switch 31 is turned OFF when the user desires that only the vibration compensation function for a shake in the vertical direction is necessary. In this state the vertical-direction driver 17 is ready to be actuated by the controller 20 but the horizontal-direction driver 19 is not actuated at all. When the horizontal-direction compensation ON/OFF switch 31 is OFF, the optical axes of the right and left compensation lenses 18a and 18b remain to be coincident with the optical axes O of the right and left telescope optical systems, respectively. In the case where the vertical-direction compensation ON/OFF switch 30 is OFF, the optical axes of the right and left compensation lenses 16a and 16b remain to be coincident with the optical axes O of the right and left telescope optical systems, respectively.

Operations of the vertical-direction image stabilizer in the case where the vertical-direction compensation ON/OFF switch 30 is ON but the horizontal-direction compensation ON/OFF switch 31 is OFF will be hereinafter discussed with reference to FIG. 3. The controller 20 commences to perform the operations shown in FIG. 3 when the main switch (not shown) of the binocular is turned ON. It is checked at step S1 whether the vertical-direction compensation ON/OFF switch 30 is ON or OFF, and the control proceeds to step S2 when it is checked that the vertical-direction compensation ON/OFF switch 30 is ON, but the control ends when it is checked that the vertical-direction compensation ON/OFF switch 30 is OFF. Thereafter, when a shaking or other sudden movement of the binocular in the vertical direction occurs during the use of the binocular, the vertical-vibration sensor 23 senses the shaking, so that the frequency signal of the sensed shaking output from the vertical-vibration amplifier 25 is input to the controller 20 (step S2). The controller 20 calculates the aforementioned vertical-direction compensation value to compensate the sensed shaking in accordance with the signal input from the vertical-vibration amplifier 25 (step S3), and outputs the calculated compensation value to the first comparator 27 (step S4). At this time the position of the vertical-direction compensation lens set 16 has been already detected by the vertical-lens-position detector 21 to be input as a corresponding signal to the first comparator 27, so that the first comparator 27 compares the input signal with the vertical-direction compensation value calculated by the controller 20 to generate the aforementioned vertical-direction difference signal. The controller 20 inputs this vertical-direction difference signal to check whether the value thereof is zero (0) (steps S5 and S6). In the case where the input vertical-direction difference signal is not zero, the controller 20 outputs a drive signal to the vertical-direction driver 17 to drive the front lens frame 12a (i.e., the vertical-direction compensation lens sets 16) in the direction so as to make the input vertical-direction difference signal zero (0) (step S7). The controller 20 continues to output drive signals to the vertical-direction driver 17 to drive the front lens frame 12a until the input vertical-direction difference signal becomes zero (0) (steps S5, S6 and S7). In the case where it is checked at step S6 that the input vertical-direction difference signal is zero, which means that the shake in the vertical direction has been properly compensated, so that the control returns. The aforementioned operations from step S1 to step S7 continue to be performed as long as the vertical-direction compensation ON/OFF switch 30 remains to be ON.

During the time the operations from step S1 to step S7 continue to be performed, although the shaking or sudden movement of the binocular in the horizontal direction is detected by the horizontal-vibration sensor 24, the horizontal-direction driver 19 is not actuated at all, even if the controller 20 inputs a horizontal-direction difference signal generated by the second comparator 28 because the horizontal-direction compensation ON/OFF switch 31 is OFF. Accordingly, when the user intentionally pans the binocular right or left in a horizontal direction, no vibration compensation operation is performed for the shaking of the binocular in the horizontal direction, which does not allow the user to notice any incongruity in the binocular vision while panning.

The aforementioned case discussed with reference to FIG. 3 is a particular case where the vertical-direction compensation ON/OFF switch 30 is ON while the horizontal-direction compensation ON/OFF switch 31 is OFF. However, when the user desires that only the vibration compensation function for a shaking in the horizontal direction is necessary, he or she only needs to turn ON the horizontal-direction compensation ON/OFF switch 31 and turn OFF the vertical-direction compensation ON/OFF switch 30. In this case the operations shown in FIG. 3 are performed only for the horizontal-direction image stabilizer. When the user desires that both the vibration and horizontal compensation functions are necessary, he or she only needs to turn both switches 30 and 31 ON. When the user does not desire either the vibration or horizontal compensation function, he or she only needs to turn both switches 30 and 31 OFF.

In the aforementioned particular embodiment of the binocular, the compensation ON/OFF switches 30 and 31 prohibit drive signals output by the controller 20 from being input to the vertical-direction driver 17 and the horizontal-direction driver 19 when the switches 30 and 31 are turned OFF, respectively. However, each of the vertical-direction driver 17 and the horizontal-direction driver 19 can be turned ON or OFF in any other way with the compensation ON/OFF switches 30 and 31.

As can be understood from the foregoing, according to the present embodiment of the binocular, since either the vertical-direction image stabilizer or the horizontal-direction image stabilizer can be selectively turned ON or OFF by the user, no unnecessary vibration compensation will be performed, which minimizes eye fatigue and power consumption of the power source 10.

Figure 4:
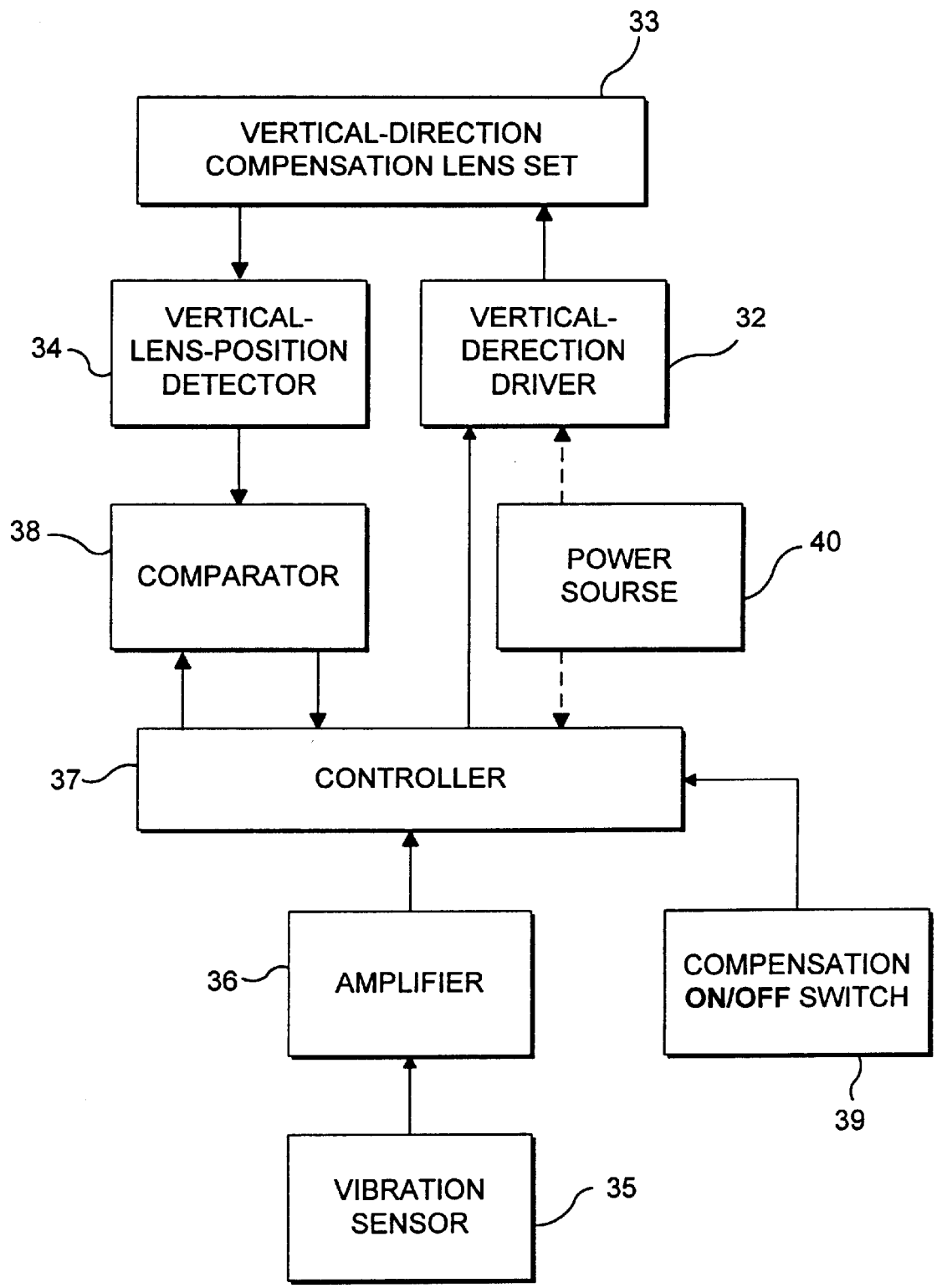
FIG. 4 is a block diagram showing an embodiment of an electrical circuit for driving the image stabilizer of another binocular.

FIG. 4 shows an embodiment of an electrical circuit for driving the image stabilizer of another binocular (second embodiment). This binocular is provided therein with a binocular optical system (not shown) similar to that shown in FIG. 1, i.e., two objective lenses 11a and 11b, two Porro prism erecting system 14a and 14b, and two eyepieces 15a and 15b in this order from the object side. However, this binocular is provided, between the objective lenses 11a, 11b and the Porro prism erecting systems 14a, 14b, with only a vertical-vibration compensation mechanism 12 but not a horizontal-vibration compensation mechanism 13. Therefore, the second embodiment of the binocular is characterized by an image stabilizer having only a vertical-vibration compensation function.

The electrical circuit of the second embodiment of the binocular is provided with a vertical-direction driver 32, a vertical-direction compensation lens set 33, a verticallens-position detector 34, a vertical-vibration sensor 35, a vertical-vibration amplifier 36, a controller 37, a comparator 38, a vertical-direction compensation ON/OFF switch 39 and a power source 40 which are substantially identical to the elements 10, 17, 16, 21, 23, 25, 20, 27, 30 and 10 shown in FIG. 2, respectively.

The position of the vertical-direction compensation lens set 33 driven by the vertical-direction driver 32 is detected by the vertical-lens-position detector 34. When shaking in the vertical direction occurs during the use of the binocular, the vertical-vibration sensor 35 senses the shaking. This sensed shaking is amplified by the vertical-vibration amplifier 36. A frequency of the sensed shaking (i.e., frequency signal) which shows the magnitude of the shaking and the direction thereof is input to the controller 37. The controller 37 calculates a vertical-direction compensation value to compensate the sensed shaking in accordance with the signal input from the vertical-vibration amplifier 36, and outputs the calculated compensation value to the comparator 38 At this time the position of the vertical-direction compensation lens set 33 has been already detected by the vertical-lens-position detector 34 to be input as a corresponding signal to the comparator 38, so that the comparator 38 compares the input signal with the vertical-direction compensation value calculated by the controller 37 to generate a vertical-direction difference signal. The controller 37 inputs this vertical-direction difference signal to check whether the value thereof is zero (0). The controller 37 continues to output drive signals to the vertical-direction driver 32 to drive the vertical-direction compensation lens set 33 until the input vertical-direction difference signal becomes zero (0) so as to compensate shaking of the binocular in the vertical direction.

The second embodiment of the binocular can be effectively used when the binocular is panned frequently right or left in the horizontal direction, i.e., in the case where only a vertical-vibration compensation function is necessary. The second embodiment of the binocular can also be effectively used by a skilled user who causes no substantial shaking of the binocular in the horizontal direction during the use of the binocular. According to the second embodiment of the binocular, the number of components of the image stabilizer which include compensation lenses, sensors, actuators, etc. can be considerably reduced by almost half of the number of components of the image stabilizer of the first embodiment of the binocular; hence, making it possible to minimize the body of the binocular and also reducing power consumption of the battery employed. Since the power consumption of the battery can be reduced, a small size battery can be employed; making it possible to further minimize the body of the binocular. Consequently, a light-weight compact binocular having an image stabilizer can be realized.

The second embodiment of the binocular can be provided with a vertical-direction compensation ON/OFF switch, similar to the vertical-direction compensation ON/OFF switch 30 of the first embodiment of the binocular.

Although the second embodiment of the binocular is provided with only the vertical-vibration compensation mechanism 12, the second embodiment of the binocular can be provided with only the horizontal-vibration compensation mechanism 13 so that the image stabilizer of the binocular has only a horizontal-vibration compensation function.

The aforementioned image stabilizer provided with the first or second embodiment of the binocular can be adopted to any other type of viewing optical instrument such as a monocular or a field scope.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A right and left binocular refracting telescopic viewing optical instrument comprising:

a first image stabilizer for stabilizing a vision in said viewing optical instrument in a vertical direction, said first image stabilizer comprising
a first movable lens holder guided in said vertical direction and
a first couple of compensation lenses held by said first movable lens holder which are positioned in right and left optical paths of said right and left refracting telescope optical systems, respectively;

a second image stabilizer for stabilizing said vision in said viewing optical instrument in a horizontal direction perpendicular to said first direction, said second image stabilizer comprising a second movable lens holder guided in said horizontal direction and a second couple of compensation lenses held by said second movable lens holder which are positioned in said right and left optical paths of said right and left refracting telescope optical systems, respectively;

a first switch for manually turning said first image stabilizer ON or OFF; and a second switch, provided independently from said first switch, for manually turning said second image stabilizer ON or OFF.

* * * * *